(12) United States Patent
Epple et al.

(10) Patent No.: US 11,479,116 B2
(45) Date of Patent: Oct. 25, 2022

(54) AUXILIARY POWER TAKE-OFF ASSEMBLY

(71) Applicant: ZF Friedrichshafen AG, Friedrichshafen (DE)

(72) Inventors: Michael Epple, Bad Waldsee (DE); Michael Trübenbach, Friedrichshafen (DE); Hermann Lanz, Frickingen (DE); Sylva Rother, Kressbronn am Bodensee (DE); Mario Holder, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 41 days.

(21) Appl. No.: 17/042,490

(22) PCT Filed: Feb. 27, 2019

(86) PCT No.: PCT/EP2019/054780
§ 371 (c)(1),
(2) Date: Sep. 28, 2020

(87) PCT Pub. No.: WO2019/185263
PCT Pub. Date: Oct. 3, 2019

(65) Prior Publication Data
US 2021/0046820 A1    Feb. 18, 2021

(30) Foreign Application Priority Data
Mar. 29, 2018    (DE) .................. 10 2018 204 912.2

(51) Int. Cl.
*B60K 17/28*    (2006.01)
*B60K 25/06*    (2006.01)
*B60K 25/02*    (2006.01)

(52) U.S. Cl.
CPC .............. *B60K 17/28* (2013.01); *B60K 25/06* (2013.01); *B60K 25/02* (2013.01);
(Continued)

(58) Field of Classification Search
CPC ........ B60K 17/28; B60K 17/22; B60K 25/06; B60K 2025/065; B60Y 2200/14; B60Y 2300/1888
See application file for complete search history.

(56) References Cited

U.S. PATENT DOCUMENTS 3,406,579 A    10/1968    Fisher et al.
4,191,072 A    3/1980    Ehrlinger et al.
(Continued)

FOREIGN PATENT DOCUMENTS

DE    1 037 277    8/1958
DE    26 56 669 B1    3/1978
(Continued)

OTHER PUBLICATIONS

German Search Report Corresponding to 10 2018 204 912.2 dated Feb. 1, 2019.
(Continued)

*Primary Examiner* — Faye M Fleming
(74) *Attorney, Agent, or Firm* — Finch & Maloney PLLC

(57) ABSTRACT

An auxiliary power take-off assembly in an automatic transmission of a motor vehicle provided with a torque converter, having a transmission input and transmission output having a drive shaft at the transmission input that is permanently connected to a drive motor of the motor vehicle via a pump shaft of the torque converter. A transmission output shaft at the transmission output, and a transmission chain includes at least one drive element and one output element. The output element can be connected to an additional unit to be driven. A switch element, which is arranged so as to act between the drive shaft and the drive element of the transmission chain for optionally connecting the drive shaft to the drive ele-
(Continued)

ment. The drive element and the output element are designed as gearwheels which are engaged with one another without an intermediate wheel.

12 Claims, 2 Drawing Sheets

(52) U.S. Cl.
CPC .. *B60K 2025/022* (2013.01); *B60K 2025/065* (2013.01); *B60Y 2200/14* (2013.01); *B60Y 2300/1888* (2013.01)

(56) References Cited

U.S. PATENT DOCUMENTS

| | | | |
|---|---|---|---|
| 4,597,301 | A | 7/1986 | Weis et al. |
| 7,765,884 | B2 | 8/2010 | Frait et al. |
| 9,290,092 | B2 | 3/2016 | Kempf et al. |
| 9,457,659 | B2 | 10/2016 | Kempf et al. |
| 2018/0339586 | A1 | 11/2018 | Trübenbach |
| 2019/0193560 | A1* | 6/2019 | Trübenbach ........... B60K 17/28 |
| 2021/0023943 | A1* | 1/2021 | Epple ..................... F16H 57/02 |

FOREIGN PATENT DOCUMENTS

| | | | |
|---|---|---|---|
| DE | 10 2005 055 795 A1 | 5/2007 | |
| DE | 10 2007 059 366 A1 | 2/2009 | |
| DE | 10 2008 033 434 A1 | 4/2009 | |
| DE | 10 2014 107 841 A1 | 12/2014 | |
| DE | 10 2015 121 019 A1 | 6/2016 | |
| DE | 10 2015 223 604 A1 | 6/2017 | |
| DE | 10 2016 212 209 A1 | 1/2018 | |
| EP | 0 677 416 A1 | 4/1995 | |
| GB | 2 153 763 A1 | 8/1985 | |
| KR | 20000066885 A * | 11/2000 | ............ B60K 17/28 |
| WO | 03/035426 A1 | 3/2003 | |

OTHER PUBLICATIONS

German Search Report Corresponding to 10 2018 204 910.6 dated Feb. 1, 2019.
German Search Report Corresponding to 10 2018 204 909.2 dated Feb. 1, 2019.
International Search Report Corresponding to PCT/EP2019/054780 dated Apr. 12, 2019.
International Search Report Corresponding to PCT/EP2019/054777 dated Apr. 12, 2019.
International Search Report Corresponding to PCT/EP2019/054781 dated Apr. 12, 2019.
Written Opinion Corresponding to PCT/EP2019/054780 dated Apr. 12, 2019.
Written Opinion Corresponding to PCT/EP2019/054777 dated Apr. 12, 2019.
Written Opinion Corresponding to PCT/EP2019/054781 dated Apr. 12, 2019.

* cited by examiner

AUXILIARY POWER TAKE-OFF ASSEMBLY

This application is a National Stage completion of PCT/EP2019/054780 filed Feb. 27, 2019, which claims priority from German patent application serial no. 10 2018 204 912.2 filed Mar. 29, 2018.

FIELD OF THE INVENTION

The present invention relates to an auxiliary power take-off assembly and a transmission with an auxiliary power take-off assembly.

BACKGROUND OF THE INVENTION

Vehicle transmissions in utility vehicles often comprise an auxiliary power take-off assembly by means of which various types of auxiliary aggregates in the vehicle can be driven. This applies in equal measure to transmissions with a friction disk clutch and a vehicle transmission equipped with a torque converter.

Auxiliary power take-off assemblies are used in particular in buses, trucks, construction machinery, agricultural vehicles or special vehicles.

Auxiliary power take-off assemblies are available in drive-dependent, clutch-dependent or motor-dependent versions. Drive-dependent auxiliary power take-off assemblies, for example, supply the hydraulic system of dual-circuit steering systems with a working pressure, whereby rolling vehicles can still be steered if the primary system has failed due to a motor breakdown. Clutch-dependent auxiliary power take-offs are suitable for short- or long-term operation during driving or at rest. Motor-dependent auxiliary power take-offs differ from clutch-dependent auxiliary power take-offs in that in motor-dependent auxiliary power take-offs there is a direct connection to the crankshaft of the drive motor, which bypasses the vehicle clutch or torque converter, so that such auxiliary power take-offs are mechanically permanently connected with the crankshaft of the drive motor. They are designed for high constant power in long-term operation and can be loaded with the maximum motor torque. They can be operated while the vehicle is driving or at rest, and can be engaged or disengaged under load. Motor-dependent auxiliary power take-offs are arranged between the motor and the transmission, they are always driven directly by the motor via a separate clutch, and can be engaged and disengaged under load while the vehicle is driving or at rest.

From DE 10 2016 21 22 09 A1 an auxiliary power take-off assembly for a motor vehicle transmission with a torque converter is known, which has a driveshaft permanently connected to a drive motor of the motor vehicle by way of the pump shaft of the torque converter. Furthermore, the auxiliary power take-off assembly comprises a transmission chain with a drive input element, an intermediate gear and a drive output element, whose drive output element is connected to an auxiliary aggregate that is to be driven, and a shifting element. The shifting element is arranged for the optional connection of the driveshaft to the drive input element, and acts between the driveshaft and the drive input element of the transmission chain. In that way the auxiliary power take-off assembly can already be decoupled, behind the driveshaft connected to the pump shaft of the torque converter, completely from the rest of the transmission chain and the auxiliary aggregate, so that these elements do not have to co-rotate when not needed and do not therefore produce any losses and noise.

SUMMARY OF THE INVENTION

The purpose of the present invention is to simplify the structure known from the prior art and to further minimize the noise and the power losses during diving operation.

This objective is achieved by an auxiliary power take-off assembly and a transmission with the characteristics specified in the independent claims. Design features are the subject of the subordinate claims.

The auxiliary power take-off assembly, in an automatic transmission having a torque converter of a motor vehicle with a transmission input and a transmission output, with a driveshaft permanently connected to a drive motor of the motor vehicle via the pump shaft of the torque converter at the transmission input, a transmission output shaft at the transmission output and a transmission chain comprising at least a drive input element and a drive output element, whose drive output element can be connected to an auxiliary aggregate which is to be driven, has a shifting element arranged to act between the driveshaft and the drive input element of the transmission chain for the optional connection of the driveshaft to the drive output element, wherein the drive input element and the drive output element are in the form of gearwheels, namely a drive input wheel and a drive output wheel, whose teeth engage directly in one another, i.e. without an intermediate gear. The transmission chain comprising only of the drive input element and the drive output element or drive input gear and drive output gear, the shifting element, bearings, shafts and gears, and the actuator system, control system and actuators, is completely integrated in the transmission housing. Thus, the automatic transmission is a transmission with an interface for the connection of end consumers, which means that an additional auxiliary power take-off is no longer needed, but the transmission provides the requisite interfaces for the end consumers.

The transmission input is on the driven side of the transmission, where the drive motor introduces torque into the transmission via an input shaft. The transmission output is on the output side, i.e. on that side of the transmission where a transmission output shaft transmits torque to a drive output shaft or a differential by way of which the wheels of the vehicle are driven.

The drive output element is arranged on a drive output shaft, which can be connected via an intermediate shaft to an auxiliary aggregate, this auxiliary aggregate being at the output of the transmission. Here, the intermediate shaft is mounted on the drive output shaft and on the transmission output side has a driving-teeth profile. By virtue of these driving teeth, various end consumers can be mounted and driven. In this case the driving teeth can drive, for example, a driveshaft or driving flange of an auxiliary aggregate, a driveshaft of a hydraulic pump, or a drive output flange. The driving teeth of the intermediate shaft can also be provided in order to receive a driveshaft of a step-up stage.

The intermediate shaft is at least partially surrounded by a protective tube. The protective tube can be fitted in the transmission on the transmission input side and the transmission output side. The protective tube can also be arranged completely inside the transmission, within the transmission housing, and mounted completely inside the transmission.

The drive input element, the drive output element, the shifting element and the drive output shaft are arranged inside the transmission housing and the auxiliary power take-off assembly is then part of the transmission, so that no further PTO is needed for driving additional aggregates. The auxiliary power take-off assembly corresponding to the features indicated above is, for the purpose, built into a transmission, which can be made available as a complete component.

The invention will be explained in greater detail with reference to figures, which show:

DETAILED DESCRIPTION OF THE PREFERRED EMBODIMENTS

Figure 1:
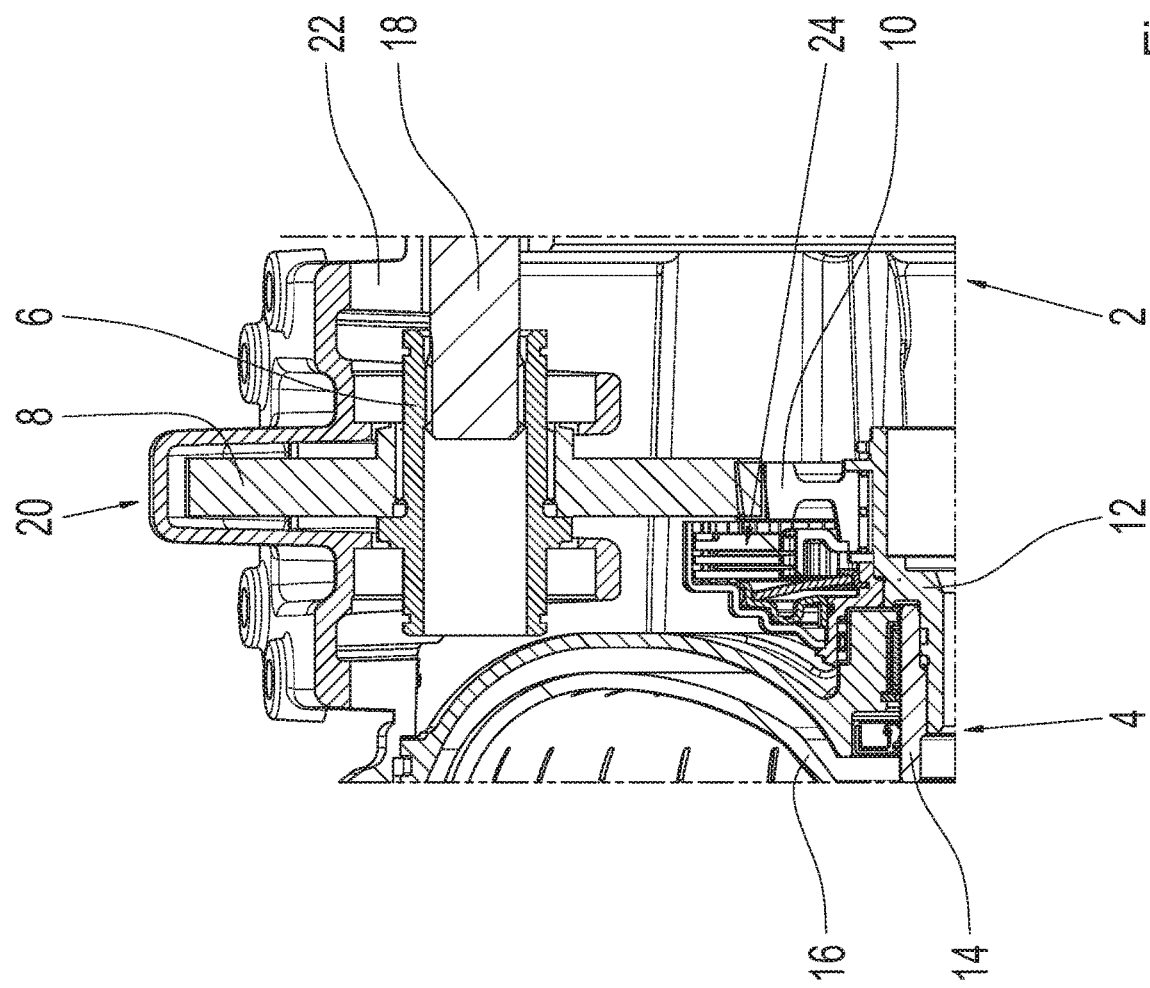
FIG. 1: A sectional view of a transmission which has an auxiliary power take-off assembly according to the invention

FIG. 1 shows a sectional view of an automatic transmission 2 according to the invention with an auxiliary power take-off assembly 20, wherein a torque converter 4 is incorporated in such manner that the pump wheel 16 is driven by a drive motor and is connected permanently to the pump shaft 14. Connected to the pump shaft 14 is the driveshaft 12 of the auxiliary power take-off assembly 20. On the drive element 10 of the auxiliary power take-off assembly 20, the drive element 10 of the auxiliary power take-off assembly 20 is mounted to rotate. The drive element 10 can be coupled to or decoupled from the driveshaft by means of a shifting element 24. In the decoupled condition, the components of the auxiliary power take-off assembly 20 and those of an auxiliary aggregate connected to the auxiliary power take-off assembly 20, if present, are no longer driven. In that way noise and power losses during driving operation are reduced. In the coupled condition, the drive element 10 transmits torque directly to a drive output element 8, which is mounted on a drive output shaft 6. This dispenses with the need for any additional transmission member in the transmission chain, in order to minimize the number of components.

Figure 2:
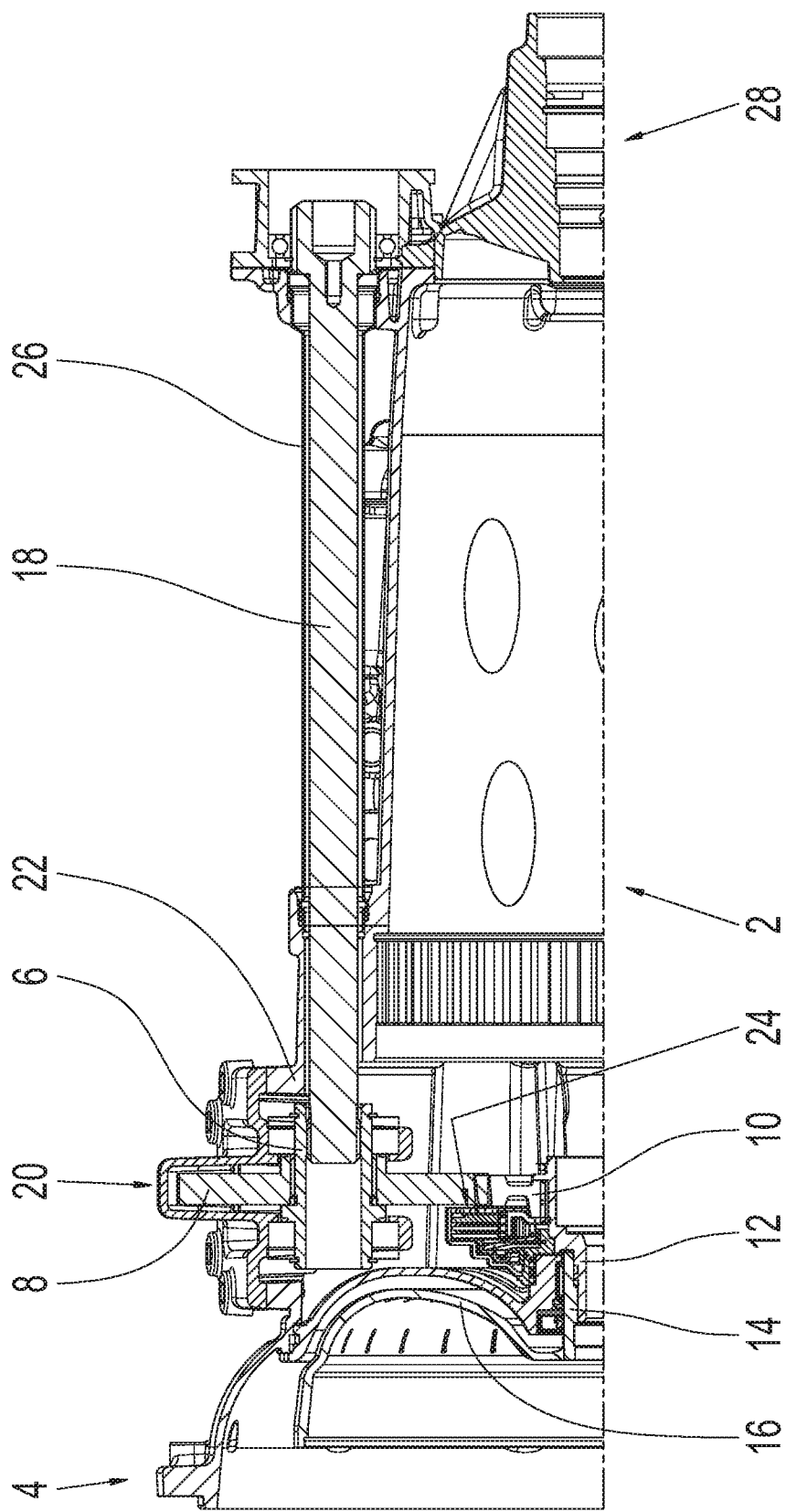
FIG. 2: An auxiliary power take-off assembly according to the invention, including an intermediate shaft

FIG. 2 shows an extended sectional view of a transmission 2 according to the invention. The pump wheel 16 is connected to the pump shaft 14, which in turn is connected to the driveshaft 12. On the driveshaft 12 is mounted the drive wheel 10, which can be coupled to or decoupled from the driveshaft 12 by means of a shifting element 24. A drive output wheel 8 is directly engaged with the drive wheel 10 and is mounted on the drive output shaft 6. In the drive output shaft 6 is mounted an intermediate shaft 18, which passes on the torque from the driveshaft to the transmission output 28 where an appropriate auxiliary aggregate or an end consumer can be connected and thereby driven. By virtue of the guiding to the transmission output 28 the auxiliary aggregates can be connected to the transmission output 28, as in the case of classical external auxiliary power take-offs. The intermediate shaft 18 is in this case surrounded by a protective tube 26 and is mounted on in the drive output shaft 6 on the transmission input side or on the drive output shaft 6 side. To drive an auxiliary aggregate the intermediate shaft 18 can have a driving profile on the transmission output side. The driving profile can receive a driveshaft or a driving flange of an auxiliary aggregate and drive it. This can be, for example, a driveshaft of a hydraulic pump or a drive output flange. The driving profile of the intermediate shaft can also be provided for receiving a driveshaft of a step-up stage. The protective tube 26 of the intermediate shaft 18 is mounted in the transmission 2 on the transmission input side and the transmission output side 28.

The power take-off assembly 20 is part of the transmission 2, since the drive element 10, the drive output wheel 8, the shifting element 24 and the drive output shaft 6 are arranged within the transmission housing 22, which means that no PTO is necessary to drive additional units.

INDEXES

2 Transmission
4 Torque converter
6 Drive output shaft
8 Drive output wheel
10 Drive wheel
12 Driveshaft
14 Pump shaft
16 Pump wheel
18 Intermediate shaft
20 Auxiliary power take-off assembly
22 Transmission housing
24 Shifting element
26 Protective tube
28 Transmission output

The invention claimed is:

1. An auxiliary power take-off assembly of an automatic transmission of a motor vehicle, having a transmission input and a transmission output, with a driveshaft permanently connected to a drive motor of the motor vehicle via a pump shaft of a torque converter at the transmission input,
    a transmission output shaft at the transmission output and a transmission chain comprising at least a drive input element and a drive output element,
    the drive output element being connectable to an auxiliary aggregate to be driven,
    a shifting element being arranged between the driveshaft and the drive input element of the transmission chain for optional connection of the driveshaft to the drive input element, and
    the drive input element and the drive output element being in a form of gearwheels which engage with one another without any intermediate wheel.

2. The auxiliary power take-off assembly according to claim 1, wherein the drive output element is arranged on a drive output shaft, which is connectable to the auxiliary aggregate by an intermediate shaft, and the auxiliary aggregate is arranged at the transmission output.

3. The auxiliary power take-off assembly according to claim 2, wherein the intermediate shaft is mounted in the drive output shaft.

4. The auxiliary power take-off assembly according to claim 2, wherein, on a transmission output side, the intermediate shaft has a driving profile.

5. The auxiliary power take-off assembly according to claim 4, wherein the driving profile receives either a driveshaft or a drive output flange of the auxiliary aggregate.

6. The auxiliary power take-off assembly according to claim 4, wherein the driving profile of the intermediate shaft receives either a driveshaft of a hydraulic pump or a drive output flange.

7. The auxiliary power take-off assembly according to claim 4, wherein the driving profile of the intermediate shaft receives a driveshaft of a step-up stage.

8. The auxiliary power take-off assembly according to claim 2, wherein the intermediate shaft is surrounded, at least partially, by a protective tube.

9. The auxiliary power take-off assembly according to claim 8, wherein the protective tube is either mounted in the transmission on a transmission input side and a transmission output side, or is mounted completely inside the transmission.

10. The auxiliary power take-off assembly according to claim 1, wherein the drive input element, the drive output element, the shifting element and a drive output shaft are arranged inside a transmission housing, and the auxiliary power take-off assembly is, therefore, part of the transmission so that no further power take-off is required for driving the auxiliary aggregate.

11. A transmission with an auxiliary power take-off assembly of a motor vehicle, having a transmission input and a transmission output, with a driveshaft permanently connected to a drive motor of the motor vehicle via a pump shaft of a torque converter at the transmission input, a transmission output shaft at the transmission output and a transmission chain consisting of at least a drive input element and a drive output element, the drive output element being connectable to an auxiliary aggregate to be driven, a shifting element is arranged between the driveshaft and the drive input element of the transmission chain for optional connection of the driveshaft to the drive input element, and the drive input element and the drive output element being in a form of gearwheels which engage with one another without an intermediate wheel.

12. An auxiliary power take-off assembly of a motor vehicle automatic transmission having a torque converter, a transmission input and a transmission output, a driveshaft of the auxiliary power take-off assembly being permanently connected, at the transmission input, to a pump shaft of the torque converter and a drive motor of a motor vehicle, and a transmission output shaft at the transmission output, the driveshaft being connected to a transmission chain comprising at least a drive input element and a drive output element, the drive output element being mounted on a drive output shaft which is connectable to an auxiliary aggregate such that the auxiliary aggregate is drivable by the auxiliary power take-off assembly, the drive input element being connectable to the driveshaft via a shifting element which is arranged between the driveshaft and the drive input element, the drive input element and the drive output element being gearwheels which directly mesh with each other, and the drive input element being supported on the driveshaft such that the drive input element is rotatable relative to the driveshaft.

* * * * *